United States Patent [19]
Magana

[11] Patent Number: 5,956,326
[45] Date of Patent: Sep. 21, 1999

[54] SYSTEM AND METHOD FOR FREQUENCY DIVISION DUPLEX/TIME DIVISION DUPLEX RADIO FREQUENCY COMMUNICATION

[75] Inventor: Javier V. Magana, Austin, Tex.

[73] Assignee: Advanced Micro Devices, Inc., Sunnyvale, Calif.

[21] Appl. No.: 08/967,433

[22] Filed: Nov. 10, 1997

Related U.S. Application Data

[63] Continuation of application No. 08/567,133, Dec. 4, 1995, abandoned.

[51] Int. Cl.$^6$ ........................................................ H04J 4/00
[52] U.S. Cl. .......................................... 370/277; 370/478
[58] Field of Search .................................... 370/478, 330, 370/436, 280, 281, 277, 294, 295, 276, 311; 379/61; 455/383, 127, 343

[56] References Cited

U.S. PATENT DOCUMENTS

| | | | |
|---|---|---|---|
| 4,129,749 | 12/1978 | Goldman | 370/330 |
| 5,134,710 | 7/1992 | Åkerberg | 455/54.1 |
| 5,428,601 | 6/1995 | Owen | 370/330 |
| 5,515,366 | 5/1996 | Chieu | 370/50 |
| 5,533,027 | 7/1996 | Åckerburg | 370/95.1 |
| 5,566,168 | 10/1996 | Dent | 370/330 |
| 5,889,814 | 3/1999 | Simmons | 370/252 |

FOREIGN PATENT DOCUMENTS

| | | |
|---|---|---|
| 0 637 144 A1 | 3/1994 | European Pat. Off. . |
| 0 637 144 A1 | 2/1995 | European Pat. Off. . |
| 0 677 930 A1 | 4/1995 | European Pat. Off. . |
| 0 677 930 A1 | 10/1995 | European Pat. Off. . |
| WO 93/17507 | 9/1993 | WIPO . |
| WO 95/25406 | 9/1993 | WIPO . |
| WO 95/25406 | 9/1995 | WIPO . |

Primary Examiner—Chau Nguyen
Assistant Examiner—Ken Vanderpuye

[57] ABSTRACT

A method of radio frequency communications between a first unit and a second unit. The method includes the steps of transmitting during a first time interval over a first frequency by the first unit, receiving during the first time interval over the first frequency by the second unit, transmitting during a second time interval over a second frequency by the second unit, receiving during the second time interval over the second frequency by the first unit. The method also includes the step of setting a select frequency shift between the first frequency and the second frequency. In one application of the method, the first unit is a cordless telephone hand set and the second unit is a cordless telephone base station. The method is particularly effective when the first unit and the second unit operate in TDD mode.

13 Claims, 3 Drawing Sheets

SYSTEM AND METHOD FOR FREQUENCY DIVISION DUPLEX/TIME DIVISION DUPLEX RADIO FREQUENCY COMMUNICATION

This is a Continuation of application Ser. No. 08/567,133, filed Dec. 4, 1995 now abandoned.

BACKGROUND OF THE INVENTION

The invention relates to radio frequency communications and, more particularly, to a frequency division duplex (FDD)/time division duplex (TDD) system. and method for radio frequency communications over limited spectrum and for low costs.

Radio components are some of the most expensive parts of radio frequency (RF) communications equipment. This is particularly the case in cordless or wireless telephony. In RF communications and, particularly, in cordless or wireless telephony, costs and operational requirements can be very important to the success of communications equipment designs. In the engineering of those designs, the designer is often presented with design constraints imposed or dictated by costs of components or by operational requirements. Such costs and operational requirements are particularly important considerations when communications equipment is intended for lower-end consumers, such as individuals and households.

In RF communication technology, various standards established by the industry and other sources often dictate aspects of performance and equipment requirements. Standards have been established, for example, for cordless or wireless telephony products and other communications devices. Certain of the most common standards of the cordless telephone industry include the Cordless Telephony Second Generation (CT2) standard, the European Conference of Postal and Telecommunications Administrations (CEPT) standard, referred to as the Cordless Telephony First Generation (CT1) standard, the Cordless Telephony First Generation Plus (CT1+) standard, and the Digital European Cordless Telecommunications (DECT) standard, among others.

The CT2 standard, for example, employs a time division duplex (TDD) system and methodology. In TDD, transmit and receive communications occur among two stations, such as, for example, a handset and base set unit of a cordless telephone, in a burst manner at distinct intervals of time. In the past, devices conforming to CT2 have transmitted and received over an identical carrier frequency within the bandwidth dictated by the standard. Communications have been possible in TDD units because different time intervals are employed for transmissions and receptions by each station. During an interval that one station is transmitting, the other is receiving, and vice versa, all over the same bandwidth. Devices built according to the CT2 standard have been considered lower-end devices, that is, the devices are typically low-cost to consumers. This low cost is, in part, attributable to the use in those devices of only a single radio front end. That is possible in CT2 devices because communications occur over the same carrier frequency in the TDD manner. The prior TDD devices, however, at least those devices conforming to the CT2 standard, have implemented the TDD methodology using a single carrier frequency. It has previously been thought that use of limited bandwidth through implementation of TDD methodology over a single carrier frequency provides the greatest advantages. This has not necessarily resulted, however, in lowest cost for the prior TDD devices, as later detailed.

Other cordless telephone standards, such as the CT1 standard, at times have employed a frequency division duplex (FDD) concept. In typical FDD, transmit and receive communications occur over two distinct, separate carrier channels. Thus, two FDD communications stations, such as, for example, a handset unit and a base set unit of a cordless telephone, each transmit and receive over different carrier channels. While a first unit is transmitting over a particular channel, the second unit is receiving on that same channel. Then, when the second unit transmits, it does so on an entirely different channel, and the first unit receives on that different channel.

FDD systems have tended to be more expensive than TDD systems because additional radio front end components have been required in prior FDD systems in order to accomplish the transmissions and receptions over the separate channels.

Beyond TDD and FDD, other communications methodologies are continually being developed. Certain promising methodologies include use of a dual channel synthesizer and spread spectrum approaches. A dual channel synthesizer may be operable in the case of dual channel communications. Prior to employing dual channel synthesizers, communications across different channels required generation of an external local oscillator (LO). A drawback of that approach was that additional filters are required to attenuate the frequency image (sometimes referred to herein as "spurs'). The use of dual channel synthesizers overcomes that drawback. Such prior use incidentally increases costs, however, because of the expense for components of two synthesizers, rather than just one.

In spread spectrum technology, a sequential noise-like signal structure is employed to spread normally narrow band information signals over a relatively wide band of frequencies. The receiver in such systems correlates the signals to retrieve the original information signal. Spread spectrum technology can provide certain benefits. A disadvantage of spread spectrum technology, however, is increased expense for devices operating according to the technology because significant processing capacity is necessary.

As is apparent, there are numerous ideas and approaches to radio frequency communications and, in particular, to such communications in cordless telephony. On the one hand, TDD methods can be advantageous because of the minimal spectrum necessary for such communications. On the other hand, FDD methods provide advantages of continuous transmission and reception. The limitations of both such methods, though, are apparent, as previously discussed. The newer communications methods also provide certain advantages, but they do so only at greater expense or by use of more spectrum. It would, therefore, be a significant improvement in the art and technology to provide an improved system and method for radio frequency communication which is low cost and requires less spectrum.

The present invention employs a unique and novel system and method for FDD/TDD radio frequency communications over a limited spectrum and for limited costs in order to provide those advantages, as well as others. Though the background of the invention has been described, in part, with respect to cordless telephone applications and, in particular, to applications under the various standards and emerging technologies described above, the invention has other and varied applications which will be hereinafter more fully understood. The invention is, thus, a significant improvement and advance in the technology and art.

SUMMARY OF THE INVENTION

An embodiment of the invention is a method of radio frequency communications. The method comprises the steps of transmitting in a first time interval, over a first frequency, and receiving in a second time interval, over a second frequency.

In another aspect, the first time interval and the second time interval differ and the first frequency and the second frequency differ.

In yet another aspect, the method further comprises the step of setting a select frequency shift between the first frequency and the second frequency.

In even another aspect, the method further comprises the steps of receiving in the first time interval over the first frequency and transmitting in the second time interval over the second frequency.

Another embodiment of the invention is a method of radio frequency communications between a first unit and a second unit. The method comprises the steps of transmitting during a first time interval, over a first frequency, by the first unit, receiving during the first time interval, over the first frequency, by the second unit, transmitting during a second time interval, over a second frequency, by the second unit, and receiving during the second time interval, over the second frequency, by the first unit.

In another aspect, the first unit is a cordless telephone hand set and the second unit is a cordless telephone base set.

In yet another aspect, the first unit and the second unit operate in TDD mode.

Yet another embodiment of the invention is a system for radio frequency communications over a first frequency and a second frequency. The system transmits and receives communications in bursts during a first time interval and a second time interval. The system comprises circuitry for transmitting during the first time interval, over the first frequency, circuitry for transmitting during the second time interval, over the second frequency, circuitry for receiving during the first time interval, over the first frequency, and circuitry for receiving during the second time interval, over the second frequency.

In another aspect, the system further comprises circuitry for selecting the first frequency and circuitry for providing a select frequency shift between the first frequency and the second frequency to synchronize more than one communications unit.

Another embodiment of the invention is a system for radio frequency communications between a first unit and a second unit. The communications are conducted over a first frequency and a second frequency. Each of the first unit and the second unit transmit and receive communications in bursts over select time intervals, including a first time interval and a second time interval. The system comprises circuitry for transmitting during the first time interval, over the first frequency, by the first unit, circuitry for receiving during the first time interval, over the first frequency, by the second unit, circuitry for transmitting during the second time interval, over the second frequency, by the second unit, and circuitry for receiving during the second time interval, over the second frequency, by the first unit.

In another aspect, the circuitry for transmitting during the first time interval and the circuitry for receiving during the second time interval are each contained within the first unit and the circuitry for transmitting during the second time interval and the circuitry for receiving during the first time interval are each contained within the second unit.

In yet another aspect, the first unit is a cordless telephone hand set and the second unit is a cordless telephone base set.

In a further aspect, the first unit and the second unit operate in a TDD mode.

Yet another embodiment of the invention is a method of radio frequency communications. The method comprises the steps of transmitting over a carrier channel in a time division duplex manner at a first frequency within a bandwidth of the carrier channel and receiving over the carrier channel in a time division duplex manner at a second frequency within the bandwidth of the carrier channel.

In another aspect, the method further comprises the step of setting the first frequency according to a select frequency shift from the second frequency.

Another embodiment of the invention is a method of radio frequency communications. The method comprises the steps of first transmitting by a first unit, first receiving by a second unit simultaneously with the step of first transmitting, second transmitting by the second unit non-simultaneously with the step of first transmitting, and second receiving by the first unit simultaneously with the step of second transmitting.

In another aspect, the method further comprises the steps of setting a first frequency for performance of the steps of first transmitting and first receiving and setting a second frequency, by a select frequency shift from the first frequency, for performance of the steps of second receiving and second transmitting.

In yet another aspect, the steps of first transmitting and second receiving are performed by a first communications unit and the steps of first receiving and second transmitting are performed by a second communications unit.

In even another aspect, the steps of setting the first frequency and setting the second frequency cause the first frequency and the second frequency to differ by a select frequency shift.

DETAILED DESCRIPTION

The following detailed description addresses certain embodiments of a novel system and method for FDD/TDD RF communications. The invention is explained by reference to prior TDD and FDD technology. It is also presented through an explanation of various cordless telephony standards and, in particular, through a discussion of adaptation of a prior RF communications device operating according to the CT2 standard. Those skilled in the art will readily recognize that the invention may be employed in varied manners and under varied conditions, as well as in other applications. All other embodiments and applications are intended to be included in the description herein.

Figure 1:
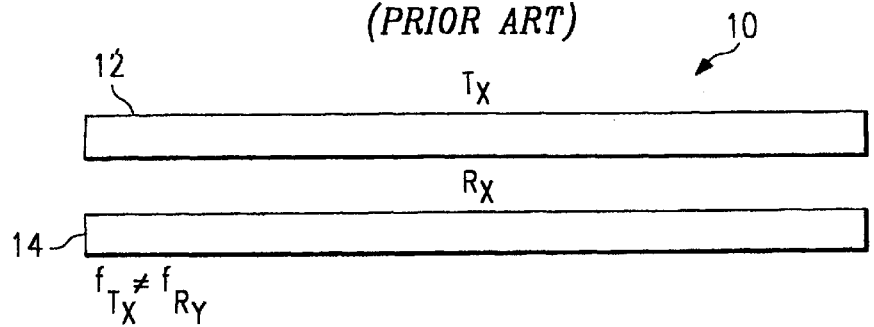
FIG. 1 is an illustration of transmit and receive signals by a RF communications unit employing a FDD methodology, wherein transmit and receive signals pass over different frequency channels.

Referring first to FIG. 1, transmit ($T_x$)12 and receive ($R_x$)14 communications of a device operating according to FDD principles are illustrated. FDD signal transmissions 12 are accomplished over a first carrier frequency and signal receptions 14 are accomplished over a second carrier frequency. In the illustration of FIG. 1, the transmission 12 over time is depicted by the top box and the reception 14 over time is depicted by the bottom box. The vertical displacement of the two boxes is employed to indicate that two separate carrier frequencies serve for transmission 12 and reception 14, respectively. The same displacement representation is used in FIG. 3 for the same reason. In the presentation of FIG. 1, as well as FIGS. 2 and 3, time progresses in passing from left to right across the page.

Still referring to FIG. 1, this FDD methodology is like that employed in cordless telephones operating according to the CT1 standard. According to that standard, analog signals are passed between communication devices as transmissions 12 and receptions 14. Operation over separate frequencies for transmit 12 and receive 14 communications has previously required more devices or components, such as, for example, radio components, in order to perform such communications, and so FDD methodology devices can be relatively expensive. Also, because FDD operations occur over the separate frequencies for transmission 12 and receptions 14, more spectrum may be used up in FDD communications, at least in comparison to typical TDD communications.

Figure 2:
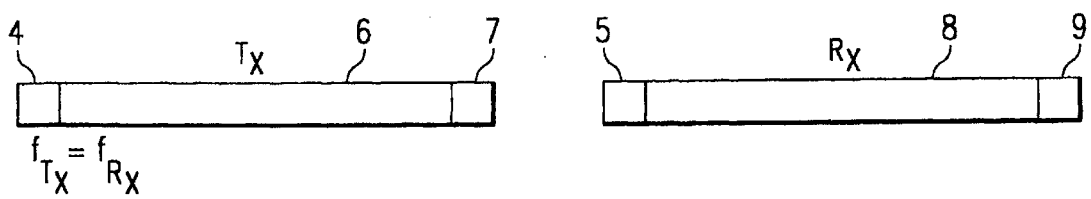
FIG. 2 is an illustration of transmit and receive signals of a RF communications unit employing a TDD approach, wherein both transmission and reception occur over the same frequency channel.

Referring now to FIG. 2, transmit 4, 6, 7 and receive 5, 8, 9 signal sequences of a TDD communications device are depicted. In TDD communications, the communications are digitized by converting the communications, for example, voice or data, into a binary pattern. The digital binary pattern is then buffered and transmitted at a high rate in bursts at distinct intervals of time. Only a single carrier frequency may be necessary for TDD communications. Time division of transmissions 4, 6, 7 and receptions 5, 8, 9 into distinct time intervals allows both receive 5, 8, 9 and transmit 4, 6, 7 signals to be accomplished over the single frequency.

Continuing to refer to FIG. 2, both the left and right boxes represent digitized communications being transmitted and received throughout periods of time. The box on the left represents a transmission ($T_x$) 4, 6, 7. The transmission 4, 6, 7 may include certain beginning transmit control bits 4 and certain transmitted information bits 6. The information bits 6 may, for example, be digitized voice or data signals. The transmission 4, 6, 7 may also include end control bits 7. The transmission 4, 6, 7 occurs on a particular carrier frequency and is burst over distinct intervals of time.

Further still referring to FIG. 2, reception ($R_x$) 5, 8, 9 of communicated information occurs over the same carrier frequency as the transmission 4, 6, 7, but at different intervals of time. This interval of time for reception 5, 8, 9 is different from the interval of the transmission 4, 6, 7. The reception 5, 8, 9 may include beginning control bits 5, received information bits 8 and ending control bits 9. Because distinct intervals of time are set for transmissions 4, 6, 7 and receptions 5, 8, 9, the same carrier frequency can support both transmissions 4, 6, 7 and receptions 5, 8, 9, albeit at those different intervals of time.

Still referring to FIG. 2, the TDD communication sequence illustrated here is the type performed by the prior communications units which conform to the CT2 standard for cordless telephones. To conform to that standard, both transmissions 4, 6, 7 and receptions 5, 8, 9 occur over the same carrier in the typical TDD manner. The interval during which both transmission 4, 6, 7 and reception 5, 8, 9 occurs is two milliseconds long. In each one millisecond of time, the standard provides that 64 bits can be transmitted 4, 6, 7 or received 5, 8, 9 by a CT2 device. A disadvantage of prior communications devices conforming to the CT2 standard has been cost of the devices.

Figure 3:
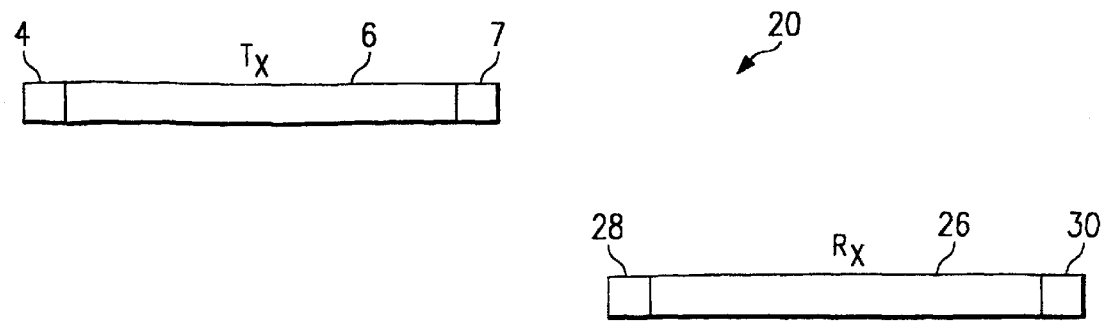
FIG. 3 is an illustration of transmissions and receptions by a unit employing the TDD/FDD RF communications approach of the present invention, wherein two carrier channels are employed for frequency division duplexed transmissions and receptions and such transmissions and receptions are burst in a time division manner.

Now referring to FIG. 3, it may be understood how the present invention employs a new FDD/TDD approach to obtain a low cost implementation of a digital cordless telephone. Transmission 4, 6, 7 and reception 28, 26, 30 according to the FDD/TDD approach of the present invention are illustrated. In the FDD/TDD approach, a RF communications unit, that is, the "radio front end" of a communications device, is designed and configured to employ FDD in a TDD manner. Such an RF communications unit (e.g., 120 in FIG. 5), may be employed with a telephone (e.g., 52 in FIGS. 4 and 5) that operates according to TDD methodology, for example, such as one conforming to the CT2 standard. In effect, the FDD/TDD approach employs a dual duplex design, i.e., a first carrier channel for transmissions and a different, second carrier channel for receptions. Over each carrier channel, communications are passed in bursts of distinct time intervals in a time division manner. In accordance with the principles of the present invention, such an FDD/TDD approach can be implemented using fewer filters and other components than required by the prior TDD devices, such as those conforming to CT2. Furthermore, the FDD/TDD approach may be implemented using a single radio front end, rather than two as typically required in FDD implementations, in each RF communications unit 120 (FIG. 5). Because fewer components are necessary in the embodiments of the invention implementing the FDD/TDD approach, the embodiments provide lower cost RF communication devices relative to costs of prior devices.

Still referring to FIG. 3, in an embodiment of the present invention, transmission ($T_x$) 4, 6, 7 occurs over a first carrier channel in a distinct time interval. Over a different, second carrier channel, reception ($R_x$) 28, 26, 30 occurs at a different, distinct time interval. In this manner, communications by transmissions 4, 6, 7 and receptions 28, 26, 30 occur in distinct and different time intervals, over different carrier frequencies for transmissions 4, 6, 7 and receptions 28, 26, 30.

Still referring to FIG. 3, the FDD/TDD methodology is particularly suited in the case of CT2 spec RF communications units, although the methodology is not limited to that application. CT2 defines a burst structure for transmissions of D channel bits 4, 7 which are meant for system control and 64 bits of voice data 6, and also the same burst structure for receptions, i.e., control bits 28, 30 and voice data 26. CT2 also defines a mux 1.2 or 1.4. In the 1.2 mux, CT2 provides for two bits per burst. In the 1.4 mux, CT2 provides for four bits per burst. CT2 further provides for time division duplexed burst communications. In the past, CT2 spec devices have been designed for transmissions and receptions over the same carrier frequency. This was possible because of the time division of the communicated bursts. Presumably, the single carrier frequency was employed in order to conserve spectrum use. Significant cost advantages are realized, however, if, instead, the FDD/TDD methodology of the present invention is employed.

Figure 4:
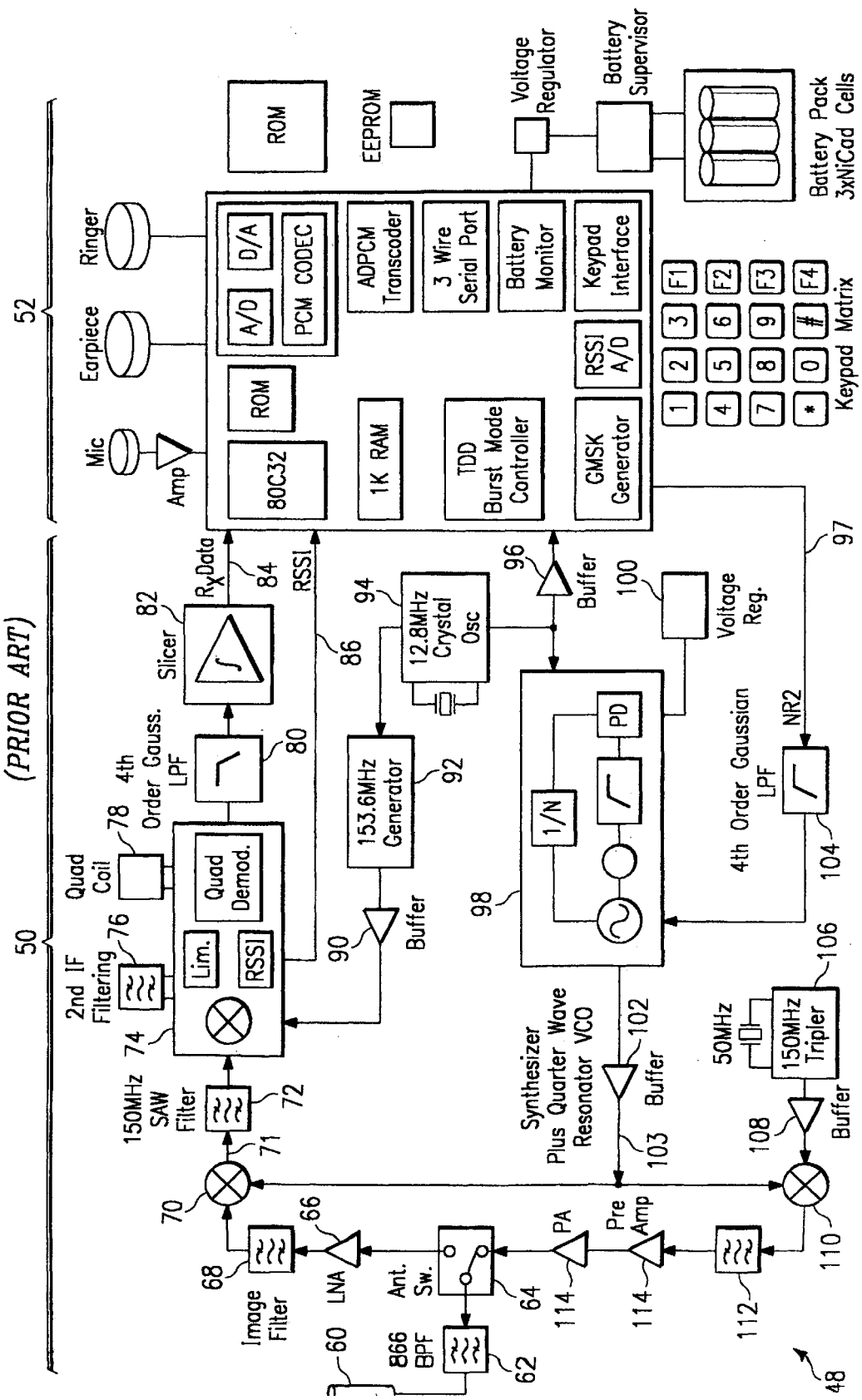
FIG. 4 is an example diagram of a handset unit for performing TDD radio frequency communications according to the CT2 standard.
Figure 5:
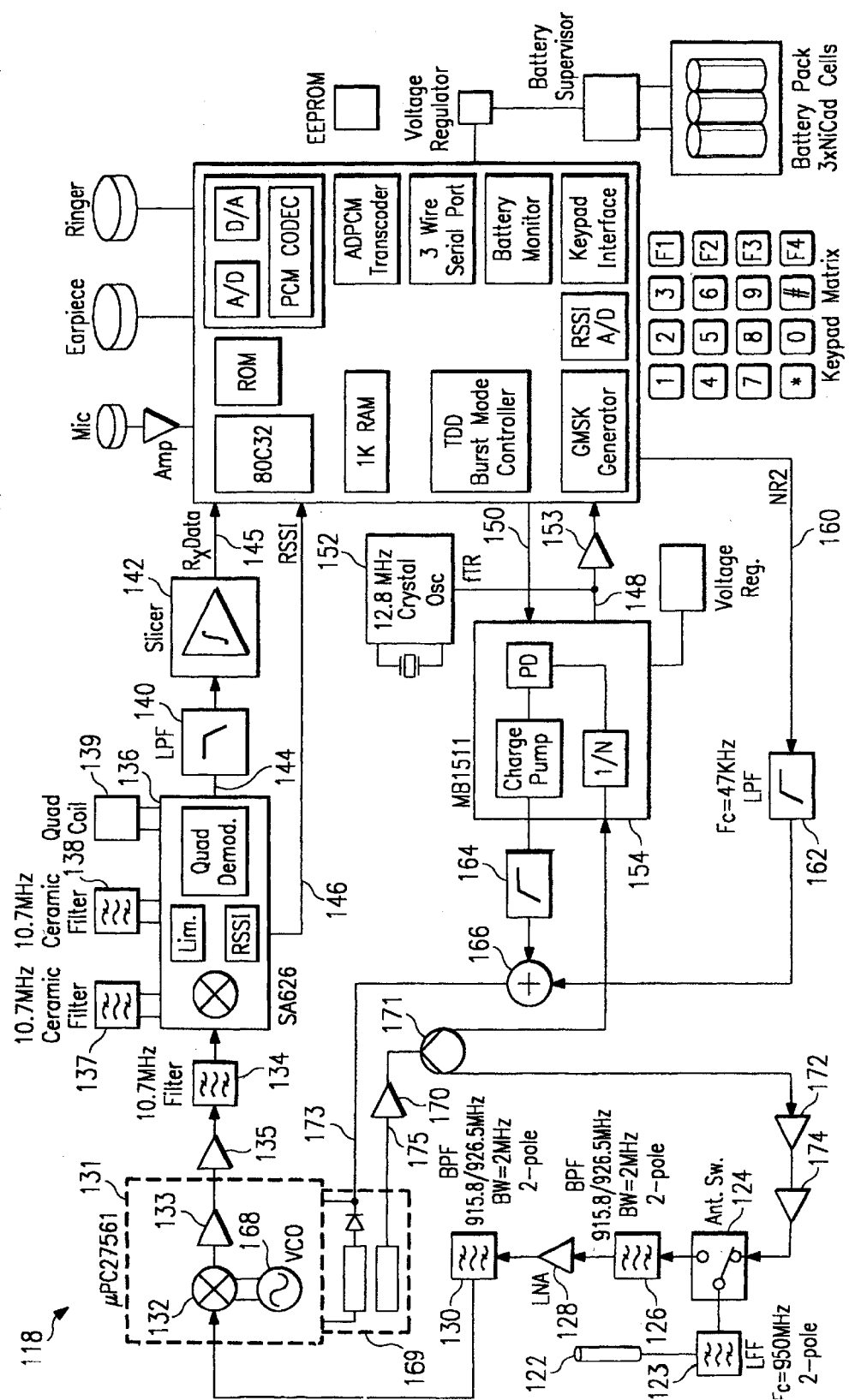
FIG. 5 is an embodiment of an example device for performing the FDD/TDD RF communications according to the present invention, which is an adaptation of the example TDD device of FIG. 4 according to the CT2 standard.

Now referring to FIG. 4, an example CT2 device 48 of the prior technology is shown in order to better understand implementation of the FDD/TDD methodology. The CT2 device 48 shown in FIG. 4 is employable in a cordless telephone hand or base unit. The telephone portion 52 of the device 48 is generally shown to the right side of the figure, and the RF communications portion 50 is generally shown to the left side of the figure. Components of the telephone portion 52 are not described in detail or particularly identified in the detailed description because the focus here is on the RF communications portion 50.

Still referring to FIG. 4, the RF communications portion 50 includes an antenna 60 for receiving signals communicated to the device 48 and for transmitting signals by the device 48. Incorporated with the antenna 60 is a band-pass filter 62. Connecting with the antenna 60 and filter 62 is an antenna switch 64, which serves to allow switching between transmission and reception of RF signals by the device 48. On the reception side, the RF communications portion 50 includes a low noise RF amplifier 66 for amplifying RF signals received by the device 48. The amplifier 66 passes the amplified signal to an image filter 68, and the signal after filtering is mixed 70 with a buffered signal from a voltage controlled oscillator 98. The mixer 70 converts the amplified 66 and filtered 68 signal to an intermediate frequency 71 signal.

Continuing to refer to FIG. 4, the intermediate frequency 71 signal is passed to a SAW filter 72. The signal is then demodulated by a down converter 74. The down converter 74 receives the signal and amplifies it, filters it, limits it, and generates receive baseband ($R_{xData}$) 84 and receive signal strength indicator (RSSI) 86 outputs. The input of the down converter 74 may be a mixer that is converted to an amplifier by generating a DC imbalance in the Gilbert Cell by altering the biasing of a crystal oscillator 94 through a resistor connected to ground. The output of the mixer may then be filtered 76. The output of the filter 76 may connect to an intermediate frequency amplifier section of the converter 74. The output of the amplifier may be limited for noise reduction and AM rejection. Output of the limiter may be coupled to an input of a multiplier. A phase shifted version of the limiter may be connected to the other input of the multiplier. The phase shift may be provided by a parallel tuned circuit which may be adjusted so that the two inputs to the multiplier are in quadrature. The converted output signal of the multiplier passes on to a low pass filter 80 and a slicer 82, and then is fed to the telephone portion 52 as the received baseband signal 84.

Still referring to FIG. 4, it is apparent that the oscillator 94 signal is bumped up by multiplying 92, and then buffered 90 before passing to the demodulator 74. In effect, the multiplying 92 and buffering 90, followed by mixing of the oscillator 94 signal with the intermediate frequency 71 signal at the converter 74, serves to down convert the received signal to a select recovered baseband signal 84 for input to the telephone portion 52. The baseband signal 84 input to the telephone portion 52 is passed to post detection processing circuitry of the portion 52. The RSSI signal 86 is passed to a baseband processor of the telephone portion 52.

Further referring to FIG. 4, a signal from the local oscillator 94 also passes to a buffer 96 and may be used by the telephone portion 52. The oscillator 94 signal furthermore is input to a synthesizer/voltage controlled oscillator (VCO) 98 as a reference. On the transmit side, a Non-Return to Zero (NRZ) signal 97 is generated by the telephone portion 52. The NRZ signal 97 is passed through a low pass filter 104 and supplied to the synthesizer/VCO 98. The synthesizer/VCO 98 may be a phase-locked loop that takes the oscillator 94 signal and drives a divide-by-P prescaler and divide-by-N counter. The output of the divide-by-N counter may be connected to an input of a phase/frequency detector. The oscillator 94 signal may be connected to a divide-by-R counter. The output of the divide-by-R counter may connect to a reference input of the phase/frequency detector. The detector generates an error signal that is used to drive the synthesizer/VCO 98 onto a programmed frequency. The synthesizer/VCO 98 may connect with a voltage regulator 100.

Still referring to FIG. 4, the signal from the voltage controlled oscillator is the carrier frequency for the transmissions 103. The transmit signal 103 then passes to a buffer 102 and is supplied to the reception side mixer 70 and is also supplied to a transmit side mixer 110. At the mixer 110, a buffered 108 signal from a tripler 106 is mixed with the transmit signal 103. The resulting signal is passed to a filter 112 and amplified 114. The amplified signal passes to the antenna switch 64 which is toggled for transmission, and the signal is transmitted. The mixing 110 encodes the transmit signal 103 onto the carrier frequency so that the signal 103 may be transmitted.

Because the prior device 48 operates in a TDD manner, both transmissions and receptions may, as they do in the particular arrangement shown in FIG. 4, occur in the RF over a single carrier frequency. As previously mentioned, the use of a single communication frequency by TDD units has been perceived as an advantage of TDD. Although perceived as an advantage, use of the single frequency for TDD transmissions and receptions requires mixing 110. Mixing 110, however, increases the numbers of components required because frequency spurs are generated and must be attenuated. To attenuate the frequency spurs, costly filters, for example, such as filter 112 in the device 48, or other components are necessary in the units. The mixing 110 and filtering 112, which have previously been necessary in the prior device 48 and other TDD communication systems, are avoided by the FDD/TDD approach of the present invention. By avoiding the mixing 110, fewer components, such as filters 112, are necessary and costs of the RF communications portion 50 is reduced.

Now referring to FIG. 5, an FDD/TDD RF communications portion 120 that implements the FDD/TDD device 118 approach of the present invention is shown. The FDD/TDD RF communications portion 120 may be operable in conjunction with a telephone portion 52 of the type of the prior TDD technology. The FDD/TDD RF communications portion 120, in comparison with the prior technology (shown in FIG. 4), in effect, operates to set a given frequency shift, coordinated at both units involved in a communication, in order to transmit and receive, respectively, over two distinct carrier frequencies rather than over a single carrier frequency like in the prior TDD technology (FIG. 4). By coordinating the frequency shift between the units, TDD transmissions and receptions are accomplished in a FDD manner at significant cost savings for the unit 118.

Still referring to FIG. 5, the FDD/TDD communications unit 118 may have the following characteristics in a communications system comprised of a handset and a base station. The handset receiver may, for example, cover the range of about 914.8 MHz to about 916.8 MHz, and the base station receiver may, for example, cover the range of about 925.5 MHz to about 927.5 MHz, both in 100 KHz increments. The first local oscillator in that example may operate at about 10.7 MHz above the receive frequency in the base station. In the embodiment, the 10.7 MHz is the frequency shift coordinated at the transmit and receive units, to achieve the two distinct carrier frequencies for transmissions and receptions by the handset and the base station.

Continuing to refer to FIG. 5 and the embodiment therein shown, on the reception side, the portion 120 includes an antenna 122 for receiving communicated signals. The antenna 122 is connected with a low pass filter 123, such as, for example, a 2-pole LC, lowpass filter, and an antenna switch 124, for example, a SPDT, PIN diode switch. The switch 124 operates to distinguish receptions and transmissions of the portion 120 and to switch between them as communication signals are received and transmitted by the device 118. Received signals are thereafter amplified, filtered, detected and converted to received data ($R_{xData}$) 144 for use by the baseband board of the telephone portion 52. The received signals, first, pass to a first band-pass filter 126, for example, a 2-pole dielectric resonator, bandpass device, then to a low noise RF amplifier 128, such as, for example, a common emitter design. If desired, the amplifier 128 may be powered only during periods in which receptions are being received to conserve power. The output of the amplifier 128 connects with a second band-pass filter 130, for example, identical to filter 130. The filter 130 serves to improve the overall image rejection and to filter the image noise caused by the amplifier 128.

Still referring to FIG. 5, the output of the second band-pass filter 130 connects to a down converter 131. The down converter 131 may include a mixer 132, a voltage controlled oscillator 168, and an intermediate frequency amplifier 133. The mixer 132 converts the amplified 128 and filtered 130 received signal, for example, a signal in the range of about 914.8 MHz to about 916.8 MHz to the handset or in the range of about 925.5 MHz to about 927.5 MHz to the base station, to an intermediate frequency, using the internal voltage controlled oscillator 168 as the first local oscillator. The voltage controlled oscillator 168 may use an external tank circuit 169, for example, comprising a chip varactor diode and a printed inductor. Some of the signal from the voltage controlled oscillator 168 is coupled from the inductor and buffered, then split for use by a synthesizer 154 and other transmit side circuitry. The output from the mixer 132, for example, a 10.7 MHz output, is amplified 135, such as, for example, by a common emitter amplifier. If desired, the amplifier 135 may be powered only during periods in which receptions are being received. A first intermediate frequency filter 134, for example, a ceramic device which may have a bandwidth of approximately 110 KHz, receives the amplifier 135 output and emits a filtered intermediate frequency signal.

Further referring to FIG. 5, the intermediate frequency signal is then input to an intermediate frequency (IF) subsystem 136. The subsystem 136 takes the intermediate frequency signal and amplifies, filters and limits it, and generates receive baseband ($R_{xData}$) 144 and receive signal strength indicator (RSSI) 146 outputs. The first stage of the subsystem 136 may be a mixer. The mixer converts the input intermediate frequency signal to a second intermediate frequency signal. Thereafter, the second intermediate frequency signal may be amplified. The mixer may be converted to provide the amplification by generating a DC imbalance in a Gilbert Cell 139, such as by altering the biasing of a crystal oscillator through a resistor connected to ground. The amplified signal may then be input to a second intermediate frequency filter 137. The output of that filter connects to an intermediate frequency amplifier that drives a final intermediate frequency filter 138 that connects to a limiter. The limiter adds gain and reduces FM noise and rejects AM.

Continuing to refer to FIG. 5, the output of the limiter may be coupled to an input of a multiplier. A phase-shifted version of that output from the limiter is connected to another input of the multiplier. The phase-shift may be provided, for example, by a parallel tuned circuit which may be adjusted so that such output and such phase-shifted version of the output are in quadrature. The output of the multiplier is the recovered receive baseband signal prior to being amplified and restored. The receive signal strength indicator (RSSI) 146 signal from the subsystem 136 may be passed to the baseband processor of the telephone portion 52. The RSSI 146 signal may be produced by the subsystem 136 by monitoring the current drawn in the amplifier and limiter stages.

Still referring to FIG. 5, the subsystem 136 may pass the receive baseband signal to various post detection processing circuitry. Thereafter, the amplified receive baseband signal may be passed to a DC restorer circuit, for example, to clamp the bottom edge of the signal. The DC restorer circuit may include, for example, a filter 140 and slicer 142. The slicer 142 converts the baseband signal to a digital signal, for example, using a 1 bit quantizer. The digital signal is passed on to the telephone portion 52 as the received data ($R_x$ Data) signal 145.

Still referring to FIG. 5, in sum, the reception side circuitry, in effect, serves to receive the received signal at a select first RF frequency of the carrier channel and render the received signal useable by the telephone portion 52 as a digital received signal 145. The select first RF frequency of the received signal is dictated at the transmitter of the other of the communication units. The select first RF frequency of the received signal of the communications unit (which, of course, is transmitted by the other communications unit) is set at a select frequency shift from the frequency of transmitted signals of the communications unit, as hereinafter described.

Continuing to refer to FIG. 5, on the transmit side of the RF communications portion 120, transmit side circuitry may accept the signal 175 from the voltage controlled oscillator 168. An amplifier 170 may then amplify the signal 175. The amplifier 170 may be powered by the same supply voltage supplied to the synthesizer 154. The amplified signal from the amplifier 170 may then be passed through a pad 171, for example, a 10 dB pad. The pad 171 serves to minimize dynamic pulling of the voltage controlled oscillator 168. The output of the pad 171 may then proceed to one or more transmitter power amplifiers 172, 174. If desired, the transmit stage may be powered only during transmit intervals. The stage may, for example, deliver about +2 dBm to the antenna switch 124. In that example, the transmit output level at the antenna 122 may be about +1 dBm.

Still referring to FIG. 5, the transmit side circuitry also includes the synthesizer 154. The synthesizer 154 may, for example, be a single chip phase-locked loop utilizing an oscillator 152, such as, for example, a 12.8 MHz crystal, for reference generation. A digital baseband transmit 150 signal is generated in a TDD manner by the baseband chip, for example, by a burst mode controller, of the telephone portion 52. The split signal along line 175 from the voltage controlled oscillator 168, via splitter 169, may be input to the synthesizer 154 and may drive a divide-by-P prescaler and divide-by-N counter. An output of the divide-by-N counter may be connected to an input of a phase/frequency detector. Such a phase/frequency detector may generate an error signal, which error signal may be used to control a chargepump and drive the voltage controlled oscillator 168 onto a programmed frequency. This is accomplished by coupling the output of the pump to a loop filter 164, which drives a summer 166; the summer 166 drives the splitter 169 via line 173. The divide-by-P, divide-by-N, and divide-by-R counters may be under serial control from the baseband board. The summing circuit is coupled to the loop filter and receives a synthesizer control voltage and a baseband modulation signal from the telephone subsystem which sums the synthesizer control voltage and the baseband modulation signal to stabilize the channel frequency.

Continuing to refer to FIG. 5, the components and sizes indicated on FIG. 5 are examples of a possible configuration of the FDD/TDD RF communications portion 120, for example, such a portion 120 to be used in a CT2 cordless telephone device. In the example, the frequency shift between transmissions 4, 6, 7, on the one hand, and receptions 28, 26, 30, on the other hand, is 21 MHz and the receive signal frequency is at about 904 MHz or about 925 MHz and the transmit signal is at the other of those frequencies. Of course, the particular frequency shift and receive and transmit signal frequencies are only an example of possible configurations employing the FDD/TDD approach of the present invention.

In sum regarding the embodiments, the circuitry of the transmit side, in effect, serves to set the frequency of the transmitted signal at a select frequency of a select shift from the received signal but, nonetheless, within the limits of the desired frequency range. The effect of setting the receive and transmit frequencies according to a select frequency shift so that receive and transmit frequencies differ is to transmit and receive in a FDD manner. Although transmissions and receptions occur in a FDD manner in the embodiment, only a single radio front-end is necessary in each communications unit. This is so because the select frequency shift dictates the transmit frequency according to the receive frequency. The select frequency shift, rather than another radio front-end, thus, provides for the FDD. Furthermore, employing FDD in this manner in conjunction with TDD allows for a reduction in the numbers of components required. The reduction in components and use of only a single radio front-end provide a particularly low cost unit.

As those skilled in the art will readily appreciate, the FDD/TDD system and method described herein provide significant improvements and advantages over the prior technology. Those skilled in the art will readily recognize the numerous variations and substitutions that may be made in the system and method and their use and configuration to achieve substantially the same results as achieved by the embodiment and, in particular, the preferred embodiments expressly described herein. Each of those variations and substitutions, as well as all other applications, of the system and method are intended to be included in the invention. The foregoing detailed description is, thus, to be clearly understood as being given by way of illustration and example only, the spirit and scope of the present invention being limited solely by the appended claims.

What is claimed is:

1. An FDD/TDD circuit arrangement in a radio-frequency communication unit having a radio-frequency communication portion and an end-user interface portion, comprising:
   an antenna switch for switching between receiving and transmitting radio signals;
   a receiver circuit coupled to said antenna switch for receiving radio signals of a first frequency during a first time interval; and
   a transmit circuit coupled to said antenna switch for transmitting radio signals of a second frequency during a second time interval said transmit circuit including
   a synthesizer for receiving a digital baseband transmit signal from said telephone subsystem;
   a loop filter coupled to said synthesizer; and
   a summing circuit coupled to said loop filter.

2. The circuit of claim 1, wherein said receiver circuit includes:
   a bandpass filter coupled to said antenna switch;
   a low noise amplifier coupled to said bandpass filter; and
   a mixer coupled to said low noise amplifier for converting said radio signals of said first frequency to an intermediate frequency.

3. The circuit of claim 2, wherein said intermediate frequency is about 10.7 MHz.

4. The circuit of claim 2, further comprising a TDD controller coupled to said receiver circuit and said transmit circuit for selectively enabling said receiver circuit and said transmit circuit.

5. The circuit of claim 1, further comprising a TDD controller coupled to said receiver circuit and said transmit circuit for selectively enabling said receiver circuit and said transmit circuit.

6. The circuit of claim 1, further comprising a TDD controller coupled to said receiver circuit and said transmit circuit f6r selectively enabling said receiver circuit and said transmit circuit.

7. The circuit of claim 1, further comprising:
   means for providing power to said receiver circuit only during said first time interval; and
   means for providing power to said transmit circuit only during said second time interval.

8. An FDD/TDD circuit arrangement in a radio-frequency communication system having an antenna and a telephone subsystem, comprising:
   an antenna switch coupled to a receive circuit and coupled to a transmit circuit for providing received signals during said first time interval to said receive circuit and providing transmit signals from said transmit circuit to said transmit circuit;
   said receiver circuit for receiving radio signals of a receive frequency during a first time interval and including,
   a bandpass filter coupled to the antenna;
   a voltage controlled oscillator;
   a mixer coupled to said voltage controlled oscillator for converting received signals from said antenna to signals having an intermediate frequency; and
   a converter circuit coupled to said mixer for converting said signals having an intermediate frequency to digital signals for the telephone subsystem;
   said transmit circuit for transmitting radio signals of a transmit frequency during a second time interval and including,
   a splitter coupled to said voltage controlled oscillator;
   a phase locked loop circuit coupled to said splitter; and
   a summing circuit coupled to said telephone subsystem and coupled to said phase locked.

9. The circuit of claim 8, wherein said intermediate frequency is a frequency separation between said transmit frequency and said receive frequency and is about 10.7 MHz.

10. The circuit of claim 8, further including a TDD controller coupled to said receiver circuit and said transmit circuit for selectively enabling said receiver circuit and said transmit circuit.

11. The circuit of claim 8, further comprising:
   means for providing power to said receiver circuit only during said first time interval; and means for providing power to said transmit circuit only during said second time interval.

12. An FDD/TDD circuit arrangement in a radio-frequency communication unit having a radio-frequency communication portion and an end-user interface portion comprising;
   an antenna switch for switching between receiving and transmitting radio signals;
   a receiver circuit coupled to said antenna switch for receiving radio signals of a first frequency during a first time interval; and
   a transmit circuit coupled to said antenna switch for transmitting radio signals of a second frequency during a second time interval;
   said radio-frequency communication system includes a telephone subsystem and said transmit circuit includes:
      a synthesizer for receiving a digital baseband transmit signal from said telephone subsystem;
      a loop filter coupled to said synthesizer for producing a synthesizer control voltage; and
      a summing circuit coupled to said loop filter, the summing circuit receiving a synthesizer control voltage and a baseband modulation signal from the telephone subsystem and summing the synthesizer control voltage and the baseband modulation signal to stabilize the channel frequency.

13. An FDD/TDD circuit arrangement in a radio-frequency communication system having an antenna and a telephone subsystem, comprising:
   an antenna switch coupled to a receiver circuit and coupled to a transmit circuit for providing received signals during said first time interval to said receive circuit and providing transmit signals from said transmit circuit to said transmit circuit;
   said receiver circuit for receiving radio signals of a receiver frequency during a first time interval and including, a bandpass filter coupled to the antenna;
   a voltage controlled oscillator;
   a mixer coupled to said voltage controlled oscillator for converting received signals from said antenna to signals having an intermediate frequency; and
   a converter circuit coupled to said mixer for converting said signals having an intermediate frequency to digital signals for the telephone subsystem;
   said transmit circuit for transmitting radio signals of a transmit frequency during a second time interval and including:
   a splitter coupled to said voltage controlled oscillator for providing signals of said transmission frequency to said antenna switch;
   a phase locked loop circuit coupled to said splitter for controlling said transmission frequency; and
   a summing circuit coupled to said telephone subsystem to receive transmission signals and coupled to said phase locked loop to receive a direct current voltage, for providing a modulating voltage to the voltage controlled oscillator.

* * * * *